May 10, 1960  R. B. MASON  2,935,764
METHOD FOR BLOWING PLASTIC BOTTLES
Filed Dec. 21, 1956

INVENTOR
ROBERT B. MASON
BY Bates + Willard
ATTORNEYS

United States Patent Office 2,935,764
Patented May 10, 1960

2,935,764
METHOD FOR BLOWING PLASTIC BOTTLES

Robert B. Mason, Mystic, Conn., assignor to Plax Corporation, Bloomfield, Conn., a corporation of Delaware Application December 21, 1956, Serial No. 629,981

5 Claims. (Cl. 18—55)

The present invention relates to improvements in process for manufacturing blown thermoplastic resin bottles and the like.

An object of the invention is to provide improved process wherein a thermoplastic resin is extruded as a tubular stream from which a bottle or the like is formed by blow molding within a multi-section mold.

A further object of the invention is to provide improved process for producing plastic bottles and particularly bottles having necks of small diameter relative to the diameter of the body, or to the greatest width dimension of a bottle of non-circular cross-section such as a rectangle or oval.

The improved process of the invention is especially suitable for manufacturing bottles of the character indicated and in which the shoulder and neck of the bottle are disposed at substantially right angles to each other.

Heretofore, in the production of plastic bottles, it has been customary to extrude the plastic in tubular form from an annular die or nozzle and to blow mold the tubular plastic within a suitable mold.

Normally it is desirable to extrude tubing of large diameter so that a minimum amount of expansion by blowing brings the bottle to final shape in the mold. The neck diameter limits the size of tubing which can be received within the neck mold without pinching the tubing and forming objectionable flash when the mold halves are closed about the tubing.

In the case of bottles having small neck diameters relative to the maximum width of the bottles, undesirably small tubing is necessary to avoid this flash and excessive expansion by blowing is required. Alternatively, if larger tubing is used to reduce the amount of blowing expansion required to fill out the bottle in the mold, the tubing is pinched when the neck mold sections close about it and the objectionable flash results.

In accordance with the present invention, subatmospheric pressure is created within the tubing so as to partially collapse the tubing and thus draw the tubing away from the parting line of the mold halves so as to avoid pinching the tubing and forming the objectionable flash therein.

Preferably, in accordance with the invention, the subatmospheric pressure within the tubing is induced by maintaining a flow of air therethrough.

In addition, a preferred form of the invention includes the extrusion of tubing of non-uniform wall thickness so that the collapse occurs along selected elements of the tubing relative to the parting line of the mold sections. More particularly, the extrusion die or nozzle provides an annular orifice which produces tubing having diametrically disposed wall portions of greatest thickness which are located adjacent the mold parting line and collapse inwardly therefrom so as not to be pinched between the neck mold parting surfaces when the mold sections close about the tubing.

Velocity of air flow through the tubing just before the mold halves close is such as to create subatmospheric pressure within the tubing being extruded, which causes partial collapse just below the orifice where the tubing is warmest and most readily deformable along the thinner elements. When the mold sections close, the collapsed portions of the tube are at the mold seams and are contained within the neck cavity of the mold without being pinched and thereby avoiding flash formations.

With the aforementioned and other objects and advantages in view, the invention consists of the hereinafter described method of operation and the novel combinations, constructions and arrangement of parts shown in the accompanying drawings of illustrative embodiments in which.

Figure 1:
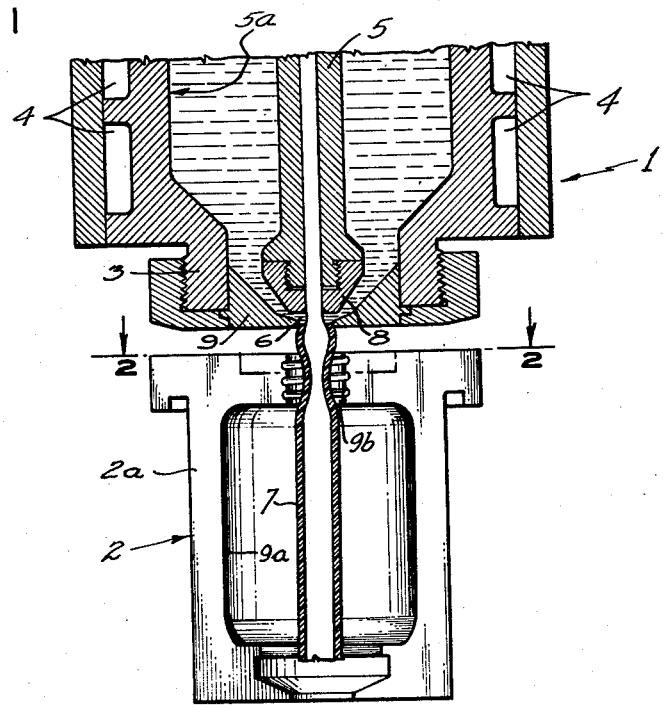
Figure 1 is an elevation view in cross-section of a tube of thermoplastic resin extruded from a nozzle into an open multi-sectional mold in accordance with the invention.

Referring to the drawings, the apparatus there shown generally comprises an extruding device or nozzle, generally designated 1, and the sections 2a and 2b of a multi-section bottle mold unit, generally designated 2.

The extruding device or nozzle 1 is associated with an extruder, or other suitable apparatus (not shown), for supplying organic plastic materal in plastic or working condition. Such apparatus does not constitute part of this invention and is omitted to simplify the illustration and description of the invention.

The nozzle 1 comprises a composite outer sleeve 3 which may include a space or chambers 4 for receiving a temperature-controlling medium. Within the sleeve 3 is a hollow plunger 5 which is concentrically spaced from the sleeve 3 to provide an annular tubular passage 5a for plastic material, the bottom of which forms an annular orifice 6 from which plastic is extruded as tubing 7. The plunger 5 also may contain a chamber or passage (not shown) for the circulation of a temperature controlling medium. Preferably the lower rounded end of the plunger 5 is conically tapered inwardly and downwardly, as shown at 8, and conforms generally to the inwardly and downwardly conically tapered orifice ring portion 9 of the sleeve 3.

Figure 2:
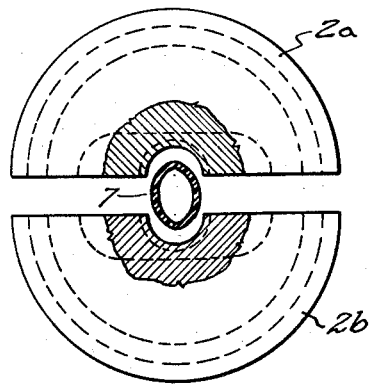
Fig. 2 is a cross-sectional view taken on line 2—2 of Fig. 1 showing the open neck mold and the partially collapsed plastic tubing.
Figure 3:
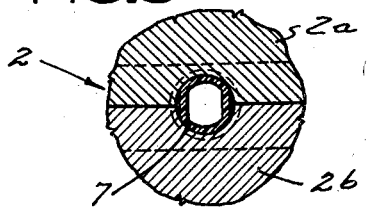
Fig. 3 is a view similar to Fig. 2 showing the mold sections closed about the tubing.
Figure 4:
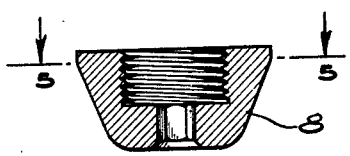
Fig. 4 is an enlarged view of tip of the mandrel shown in Fig. 1.
Figure 5:
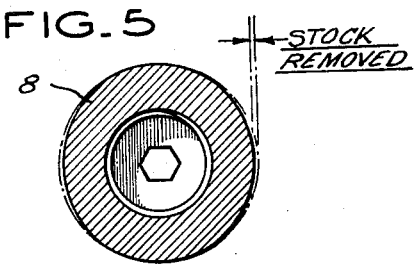
Fig. 5 is a cross-sectional view taken on line 5—5 of Fig. 4.

As shown in Figs. 4 and 5, the inner member 8 of the annular orifice 6 is slightly cut or shaved along diametrically opposite conical elements so that the wall of the tubing extruded from the orifice is thickest on the parting line of the mold sections 2a and 2b and is produced between the ring 9 and the portions of the inner orifice member 8 which are shaved or cut away the most. The tubing wall, as shown in Fig. 2, gradually decreases to minimum thickness on diametrically opposite elements which are located at 90° to the mold parting line. As shown in Fig. 5, the depth of the cut-away portions gradually diminish to zero.

The annular outlet orifice 6 through which the heated or otherwise plasticized and suitable homogenized organic plastic resin, such as, for example, polyethylene is extruded as tubing 7, may be stationarily mounted or movably mounted for vertical movement as disclosed in U.S. Patent No. 2,349,176, issued May 16, 1944, to William H. Kopitke. In any case, it is contemplated that the head 1 be so disposed that the mold sections 2a and 2b of the multi-section mold 2 may be brought into registry with the extrusion head 1.

In the embodiment illustrated, the mold sections 2a, 2b preferably are mounted on a rotary turret table (not shown) which preferably carries a plurality of equally spaced-apart molds identical with mold 2.

The mold sections 2a and 2b may be automatically opened and closed in timed sequence with the extrusion of the tubing 7 from the extruder head 1 and the operation of other components of the apparatus by suitable timing mechanism (not shown).

The illustrated mold sections 2a and 2b form a mold cavity in which to blow mold and shape the plastic tubing 7 into a bottle or the like.

In the embodiment shown in the drawing, the mold cavity includes a main body molding portion 9a and a much narrower neck molding portion 9b.

The flow of air through the plunger 5 into the tubing 7 may be effected throughout extrusion of tubing, or only long enough to effect the partial collapse of the tubing necessary to avoid mold pinch and neck flash and to blow mold a bottle from the tubing within the closed mold.

Preferably blowing pressure is maintained within the blown article until the plastic is thoroughly set and shape retaining.

In the case of bottles of non-circular cross section, as shown in Fig. 2, the thicker wall portions of the tubing 7 are adjacent the deeper mold cavity recesses of the mold 2 where the greater amount of expansion, and plastic for that expansion, is required.

Having thus described the invention, I claim:

1. The method of forming a hollow article of plastic material employing a blow mold having relatively narrow and wide molding portions which comprises extruding and suspending a tubular length of softened plastic materal, introducing a sufficient flow of fluid medium through said tubular length of material to partially collapse a portion of the suspended length of material, closing the blow mold about the suspended length of material to enclose said partially collapsed portion with the relatively narrow molding portion of said blow mold, and blow molding the length of material within said blow mold.

2. The method recited in claim 1 and wherein the tubular material is extruded with diametrically opposite thicker wall portions which collapse inwardly when the flow of fluid medium is effected through the tubular material.

3. The method recited in claim 2 and wherein the blow mold closes on a parting line passing through said collapsed thicker wall portions of the tubular material.

4. The method recited in claim 1 and wherein the flow of fluid medium continues during extrusion of said length of material.

5. The method recited in claim 1 and wherein the flow of fluid medium commences after at least a portion of said length of material is extruded.

References Cited in the file of this patent

UNITED STATES PATENTS

| | | |
|---|---|---|
| 1,892,477 | Weber | Dec. 27, 1932 |
| 1,926,905 | LeCoultre | Sept. 12, 1933 |
| 2,283,751 | Ferngren | May 19, 1942 |
| 2,457,687 | Kopitke | Dec. 28, 1948 |
| 2,541,249 | Hobson | Feb. 13, 1951 |
| 2,632,202 | Haines | Mar. 24, 1953 |
| 2,674,006 | Bailey et al. | Apr. 6, 1954 |
| 2,750,625 | Colombo | June 19, 1956 |
| 2,792,593 | Hardgrove | May 21, 1957 |

FOREIGN PATENTS

| | | |
|---|---|---|
| 677,212 | Great Britain | Aug. 13, 1952 |